(12) United States Patent  
Moreton

(10) Patent No.: US 7,502,035 B1
(45) Date of Patent: Mar. 10, 2009

(54) APPARATUS, SYSTEM, AND METHOD FOR MULTI-SAMPLE PIXEL COALESCING

(75) Inventor: Henry Packard Moreton, Woodside, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 11/621,009

(22) Filed: Jan. 8, 2007

Related U.S. Application Data

(63) Continuation-in-part of application No. 11/313,192, filed on Dec. 19, 2005, now Pat. No. 7,450,136.

(51) Int. Cl.
*G09G 5/00* (2006.01)
(52) U.S. Cl. .................... 345/611; 345/612; 345/614
(58) Field of Classification Search ............. 345/506, 345/582
See application file for complete search history.

(56) References Cited

U.S. PATENT DOCUMENTS

| | | | | |
|---|---|---|---|---|
| 6,633,297 B2* | 10/2003 | McCormack et al. | ....... | 345/506 |
| 6,636,232 B2 | 10/2003 | Larson | | |
| 2004/0066388 A1 | 4/2004 | Leather et al. | | |
| 2004/0174360 A1 | 9/2004 | Deering et al. | | |
| 2004/0183795 A1* | 9/2004 | Deering et al. | ............. | 345/419 |
| 2006/0170703 A1* | 8/2006 | Liao | ......................... | 345/613 |

* cited by examiner

*Primary Examiner*—Kee M Tung
*Assistant Examiner*—Jacinta Crawford
(74) *Attorney, Agent, or Firm*—Cooley Godward Kronish LLP

(57) ABSTRACT

A graphics processing apparatus coalesces groups of primitives for concurrent processing in a pixel shader. In one implementation, the shader concurrently processes coalesced groups for multisampling. In another implementation, the shader concurrently processes coalesced groups to calculate derivative information.

7 Claims, 11 Drawing Sheets

APPARATUS, SYSTEM, AND METHOD FOR MULTI-SAMPLE PIXEL COALESCING

CROSS-REFERENCE TO RELATED APPLICATIONS

This application is a continuation-in-part of U.S. patent Ser. No. 11/313,192, filed on Dec. 19, 2005, entitled, "Apparatus And System For Generating Texture Derivatives For Pixel Processing," by Henry Packard Moreton.

FIELD OF THE INVENTION

The present invention is generally related to multi-sampling in graphics systems. More particularly, the present invention is directed towards improving the efficiency of multi-sampling calculations.

BACKGROUND OF THE INVENTION

Conventionally, a graphics surface is divided into smaller primitives (e.g., triangles). The primitives are rasterized and other operations are performed to generate fragments for visible portions of primitives. Individual fragments are also shaded to generate the fragment color, generate transparencies, and perform other effects. Note that a fragment refers to a portion of a pixel, where a pixel corresponds to a region of the display or image. However, due to the close relationship between fragments and pixels, in the graphics art the term "pixel" is sometimes used equivalently to the term "fragment" in regards to shading operations. In this context, a pixel may be either fully or partially covered.

A graphics pipeline typically includes a pixel shader to shade pixels. A pixel shader converts a set of texture coordinates into a color using a shader program. Note that a pixel shader may also perform other operations and may, for example, accept interpolated inputs and produce general outputs. For example, the DX10 API permits a single pixel to hold as many as 32 values on output. Textures conventionally have horizontal and vertical texture coordinates mapped to an (s, t) space using a plane equation or other interpolation methods. The pixel shading may, for example, be performed using parallel processing units.

Note that in a conventional pixel shading paradigm the shading of primitives is performed largely independent of one another. This permits the processing work to be distributed amongst parallel shading elements until all of the primitives of a frame are shaded. Thus, in a conventional shading paradigm a first primitive is shaded, then another, and so on until all of the primitives of the frame are shaded. One aspect of this shading paradigm is that typically intermediate calculations used to shade pixels of individual primitives are not retained after a particular primitive is shaded. Note that the primitives may also be shaded "side by side" in adjacent shader units. In either case, the intermediate calculations are not available across primitives.

In addition to performing texture operations to calculate a pixel color, a pixel shader may also perform other filtering operations that require calculating an estimate of texture derivatives with respect to neighboring pixels. The derivatives are estimated based on differences in texture values with respect to a neighboring pixel. The texture coordinates may, for example, be calculated at pixel centers in a multi-pixel "footprint." As one example, the footprint may be a group of four pixels (a "quad") including the pixel being shaded. Thus, a common algorithm for shading an individual pixel is to select a footprint of pixels about the pixel, determine the texture coordinate at pixel centers in the footprint about the pixel being shaded using an appropriate technique, and estimate texture derivatives for filtering the pixel being shaded.

Additionally, graphics systems often employ multi-sampling techniques to reduce the effects of aliasing. Aliasing effects are generated at the edges of partially covered pixels, because a sharp edge corresponds to an "infinite" frequency such that steps will be visible at edges unless blurred. Aliasing effects commonly generate jagged-looking edges, what are sometimes known as "jaggies." In multi-sampling each pixel has two or more locations that are sampled for coverage. Conventionally, a single color is calculated per pixel and used for all subpixel samples covered by the primitive.

A problem with conventional pixel shaders is that the efficiency of the shading process tends to decrease as the triangle size shrinks. As the triangle size shrinks, a larger percentage of the pixels are are partially covered edge pixels. For the case of texture derivatives, the decrease in efficiency with decreasing triangle size is caused by the need to calculate neighboring exterior pixels outside of a triangle solely for the purpose of estimating texture derivatives for edge pixels of the triangle. As a result, triangles having a comparatively small size will require a significant number of exterior pixels per interior pixel to be calculated solely for estimating texture derivatives. An analogous problem occurs in regards to the efficiency of calculations performed for multisampling as the triangle size shrinks.

FIG. 1 illustrates a primitive 100 which is to be shaded. An individual pixel 112 has a pixel center within primitive 100 proximate edge 105 such that pixel 112 will be shaded. In order to calculate texture coordinate derivatives for pixel 112, texture values for other pixels 114, 116, and 118 outside of primitive 100 must be calculated as part of a group derivative footprint 110, such as a quad of four pixels. Thus, for a pixel 112 to be shaded, the other pixels 114, 116, and 118 within the group footprint 110 must also be shaded to generate derivative information. For a comparatively large primitive 100 this may not be a concern since the perimeter-to-area ratio is low. However, referring to FIG. 2, for a comparatively small primitive 200, the perimeter-to-area ratio increases. As a result, a large percentage of the pixels will be edge pixels, such as a pixel 212 near edge 205, increasing the fraction of exterior pixels that must be calculated for the sole purpose of generating derivative information. For example, exterior pixels 214, 216, and 218 of quad 210 must be rendered to generate texture derivatives for pixel 212. It can be understood from comparing FIGS. 1 and 2 that as the triangle size shrinks the cost per output pixel goes up because the dummy pixels required to calculate texture derivatives increases.

It can also be understood from comparing FIGS. 1 and 2 that as the triangle size shrinks the computational resources required to perform multi-sampling increases. In multi-sampling the color of the same pixel is calculated twice (or more) once for each sample location within the pixel covered by a different primitive. Referring again to FIG. 1, an individual edge pixel 140 has multi-sample locations 142 and 144. Referring to FIG. 2, edge pixel 240 has multi-sample locations 242 and 244. However, due to the smaller size of primitive 200, a larger fraction of pixels are partially covered pixels than for the case of FIG. 1.

There is an increasing interest in performing graphics processing of complex surfaces. Complex surfaces are best processed by dividing the surface into comparatively small primitives (triangles). However, as previously described, this may result in a large increase in the waste of resources that must be devoted to calculating texture derivatives and for performing multi-sampling.

In light of the above-described problems, the apparatus and system of the present invention was developed.

SUMMARY OF THE INVENTION

A graphics system identifies groups of adjacent primitives that can be coalesced into groups for performing concurrent processing on coalesced groups. In one embodiment, multi-sample calculations for pixels straddling common boundaries between primitives of a coalesced group are performed concurrently, providing improvements in performance.

One embodiment of a graphics processing apparatus performs multi-sampling operations in which pixels are sampled at two or more sample locations within the pixel. The apparatus includes a raster stage configured to identify neighboring primitives for concurrent multi-sample processing as coalesced groups. A pixel shader is configured to concurrently perform multi-sample processing of the coalesced groups.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
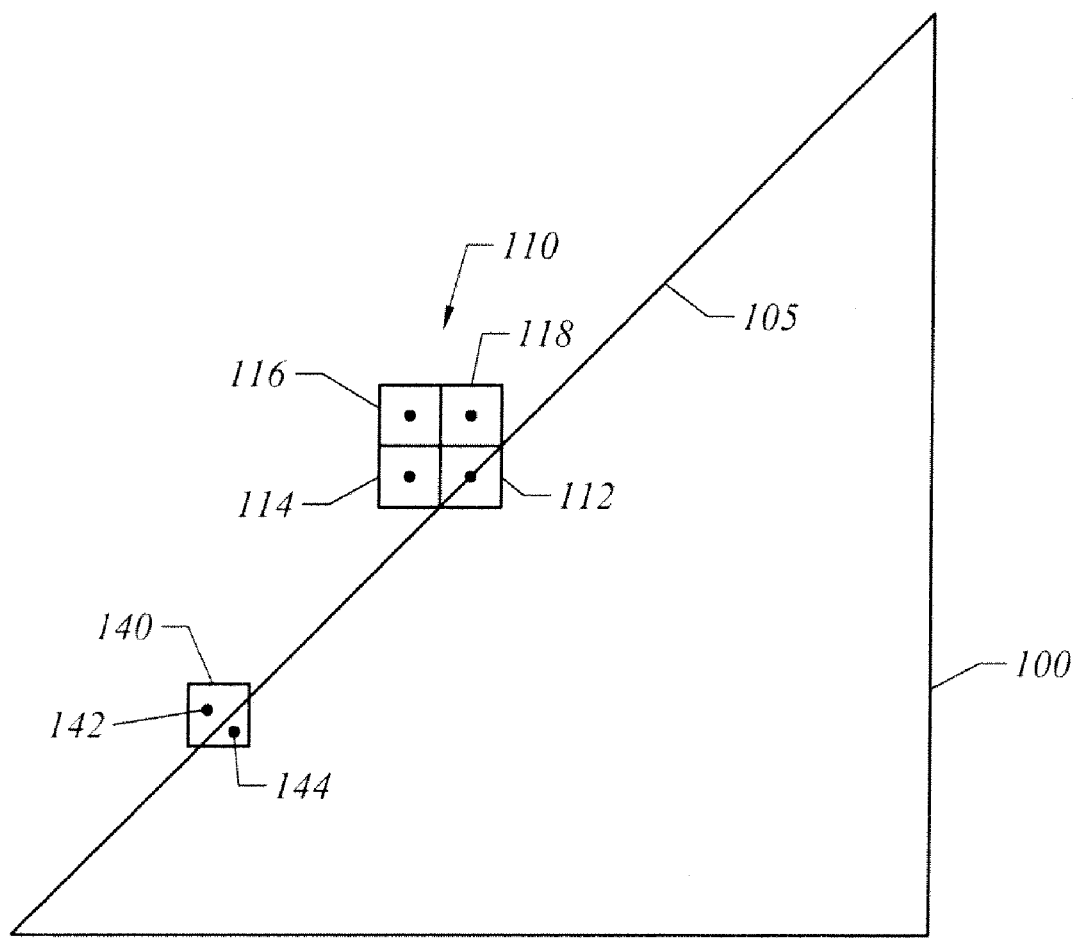
FIG. 1 illustrates a first example of derivative calculation for shading a pixel of a first primitive in accordance with the prior art.
Figure 2:
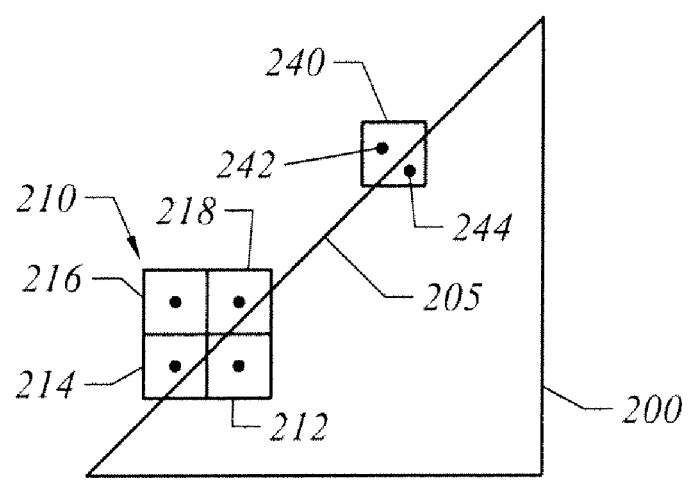
FIG. 2 illustrates a second example of a derivative calculation for shading a pixel of a second primitive in accordance with the prior art.
Figure 3:
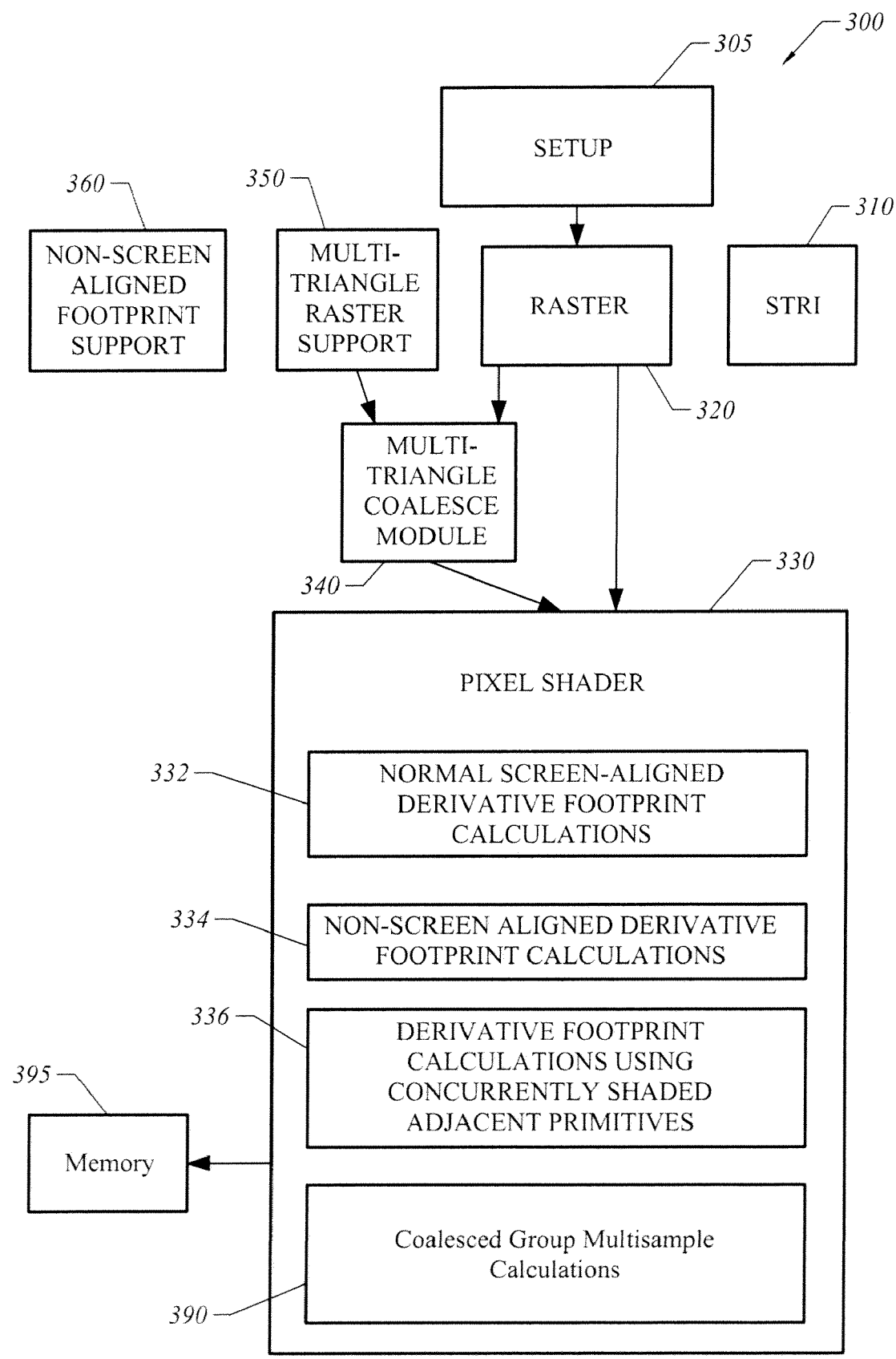
FIG. 3 illustrates a pixel processing apparatus in accordance with one embodiment of the present invention.

FIG. 3 illustrates a pixel processing unit 300 for shading pixels of primitives in accordance with one embodiment of the present invention. In the following discussion, triangles are described as exemplary primitives requiring pixel processing. However, it will be understood throughout the following discussion that other types of primitives may also be processed by pixel processing unit 300. However, triangles are the most common type of primitive.

Pixel processing unit 300 includes a triangle setup unit 305, a unit to interpolate attributes across a triangle, such as a triangle plane equation (STRI) unit 310, raster stage 320, and a pixel shader 330. Shaded pixels are output to a raster operations (ROP) stage (not shown) and may, for example, be stored in a frame buffer (not shown). Registers (not shown) may be utilized to temporarily store data during data processing operations. Pixel processing unit 300 may also be implemented as a parallel architecture having parallel pixel shaders 330.

Pixel processing unit 300 performs pixel shading operations to determine the color of individual pixels of triangles and in one embodiment also perform multi-sample anti-aliasing. As previously described, In multi-sampling anti-aliasing each pixel has two or more locations that are sampled for coverage. In one embodiment at least one pixel processing operation requires estimates of texture derivatives. If, for example, a texture (s, t) has texture coordinates (s, t) then a calculation that uses difference among pixels, such as estimates of derivatives in (s, t), coordinates is required. As an illustrative example, the texture coordinate derivative may be required to perform a filtering operation. The derivative is estimated from a difference equation using values of texture coordinates at neighboring pixels within a derivative footprint. The derivative footprint, may, for example, be a quad group of four pixels.

In one embodiment, pixel shader 330 includes a normal screen aligned derivative footprint calculation module 332, a non-screen aligned derivative footprint calculation module 334, and an adjacent primitive derivative footprint calculation module 336. The different modes for calculating texture derivatives are supported by other elements of pixel processing unit 300. A non-screen-aligned footprint support module 360 supports adjusting the derivative footprint of pixels to reduce the number of pixels exterior to a triangle that are required to calculate derivatives.

The raster stage 320 has associated modules to support forming coalesced groups of primitives (e.g., coalesced groups of triangles). A multi-triangle raster support module 350 supports rasterizing neighboring triangles of the same surface concurrently. A multi-triangle coalesce module 340 is provided to coalesce neighboring adjacent triangles that are generated from the same surface and are non-overlapping. Note that adjacent non-overlapping triangles must also face the same direction (e.g. be forward or backward facing). For the case of individual pairs of triangles, the triangles have a shared boundary.

In one embodiment, non-screen-aligned footprint support module 360 determines whether a shift in derivative footprint alignment reduces the number of pixels exterior to a primitive that must be rendered to generate derivative information. The derivative footprint alignment that results in the smallest computational effort is then selected. As one example, the alignment can be shifted from an alignment in which the derivative footprint is centered on odd pixels to even pixels. However, more generally, the derivative footprint may be aligned with respect to an individual triangle to achieve the greatest reduction in the number of exterior pixels that must be calculated to generate derivative information for interior pixels. Note that a relaxed grouping of derivative footprints could also be used, where overlap is permitted allowing for further and/or more flexible work reduction.

Figure 4:
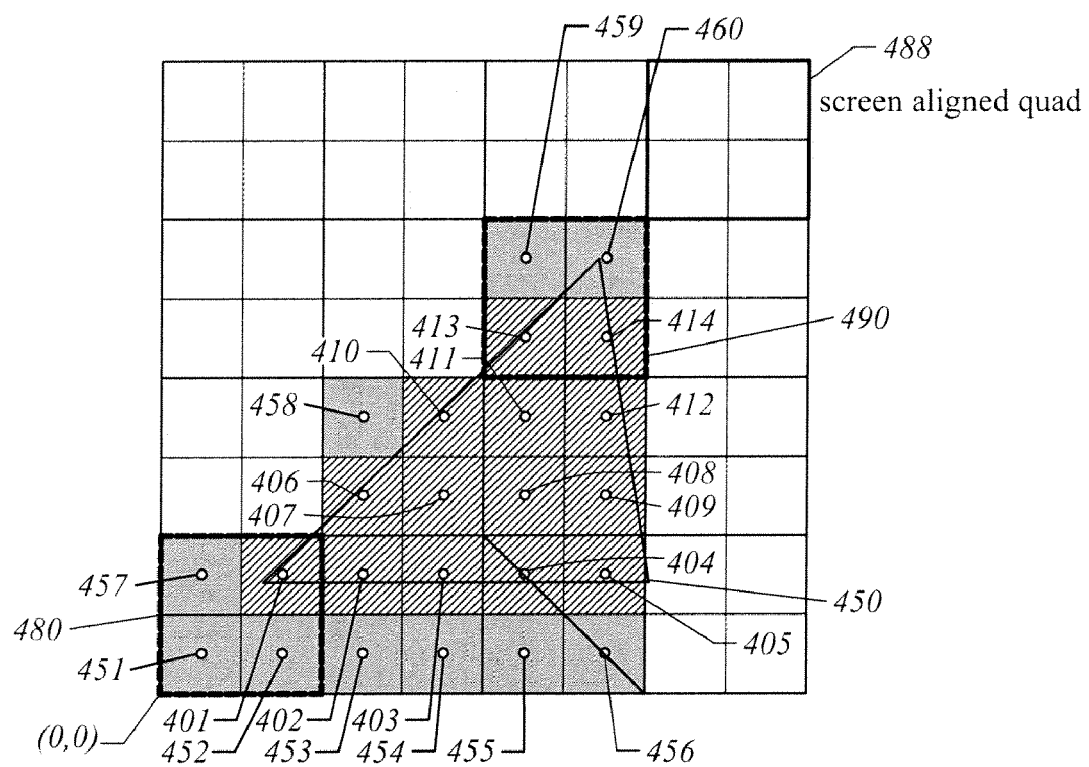
FIG. 4 illustrates a screen-aligned mode of operation in which derivative footprints used to calculate derivative information for a primitive corresponds to screen-aligned quads.

FIG. 4 is a diagram of a triangle 450 and exemplary pixels oriented with respect to a screen format having an origin (0, 0) and pixel positions referenced to horizontal and vertical axes. In this example pixel processing unit 300 utilizes a screen-aligned derivative footprint of a quad of four pixels to calculate texture derivatives. The major bold lines correspond to quad groups of four pixels. An exemplary screen aligned quad 488 (not covering triangle 450) is illustrated in the top right corner. In this example the rule for calculating texture derivatives is that each of the fourteen interior pixels 401, 402, 403, 404, 405, 406, 407, 408, 409, 410, 411, 412, 413, and 414 having a pixel center within triangle 450 calculates texture derivatives based on the screen aligned quad that contains the pixel that is being shaded. An additional ten pixels, pixels 451 to 460, lie outside of triangle 350 but must also be rendered as part of the six screen-aligned quads used to calculate derivatives for interior pixels. For example, derivatives for pixel 401 are calculated from a screen aligned derivative footprint 480 (illustrated by dashed lines) that is a quad including exterior pixels 451, 452, and 457; derivatives for pixel 414 are calculated from a screen aligned derivative footprint 490 (illustrated by dashed lines) that is a quad including pixels 413, 459, and 460. In this example, twenty-four pixels have to be rendered in order to shade a triangle having fourteen pixels.

Figure 5:
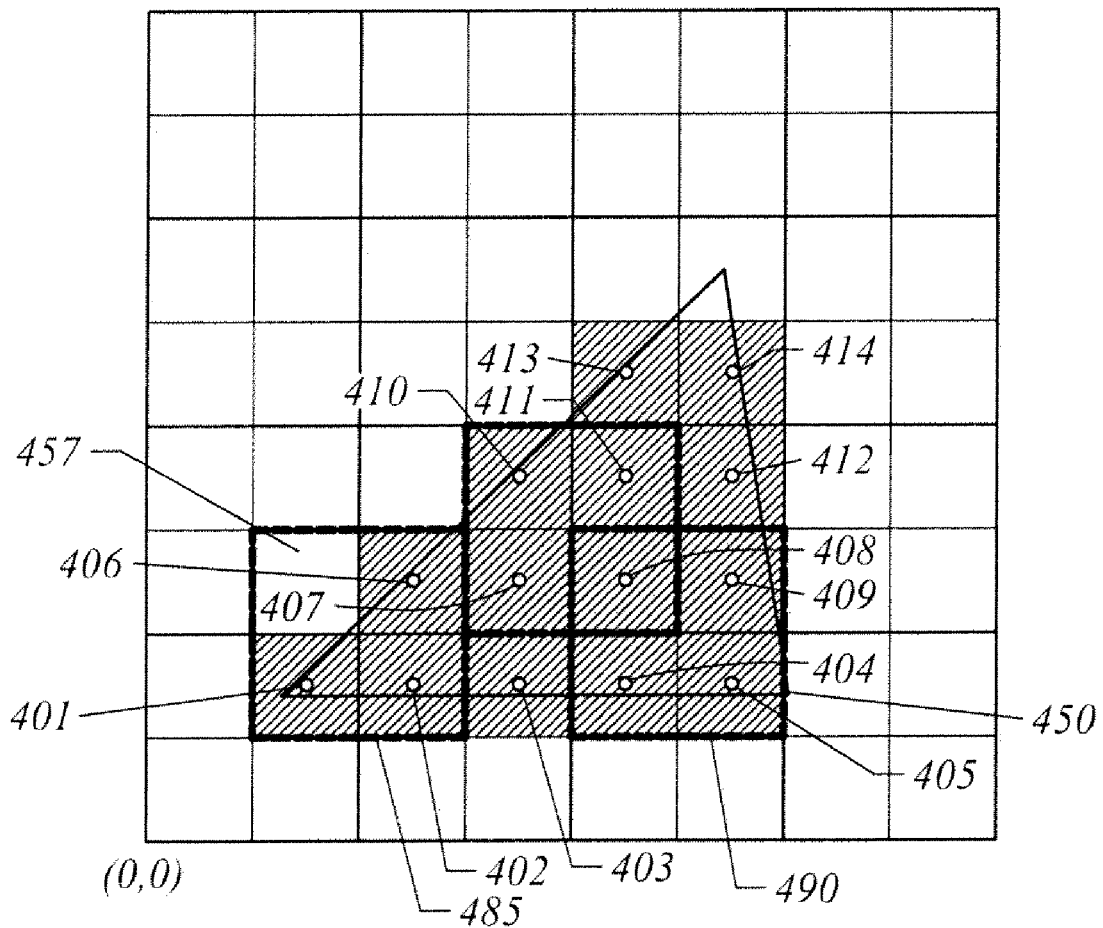
FIG. 5 illustrates a non-screen aligned mode of operation in which derivative footprints used to calculate derivative information are shifted to an alignment selected to reduce the number of exterior pixels required to generate derivative information for interior pixels.

FIG. 5 illustrates an example of a non-screen aligned mode of operation for triangle 450. In this example, the centers of the derivative footprints (e.g. quads) are shifted to an alignment selected to reduce the number of exterior pixels that must be calculated solely to generate derivative information for interior pixels. For example, an individual derivative footprint may be centered on odd pixels or even pixels in the (x, y) coordinates. Exemplary derivative footprints 485 and 490 are quads, as indicated by dashed lines. In this example, shifting to a non-screen aligned mode of operation requires rendering only one additional exterior pixel 457 to generate derivative information. The non-screen alignment format may, for example, include rules that define the centers of derivative footprints based on the relative positions of the edges of triangle 450 with respect to horizontal and vertical screen aligned quads. Alternatively, an algorithm may be performed to compare different derivative footprint alignments and then select the one requiring the least computation of exterior pixels.

Referring back to FIG. 3, pixel processing unit 300 identifies pairs of primitives which can be shaded concurrently to reduce texture derivative computations. In one embodiment multi-triangle raster support module 350 rasterizes groups of neighboring pairs of triangles. As an illustrative example, multi-triangle raster support module 350 may detect that mesh primitives are being generated or that tessellation is being utilized. In one implementation, the output of multi-triangle raster support module 350 is pixels of neighboring triangles which are rasterized at the same time. Alternatively, multi-triangle raster support module 350 may work cooperatively with raster stage 320. Multi-triangle raster support module 350 may, for example, identify neighboring triangles from the same graphical surface according to one or more rules. Multi-triangle coalesce module 340 coalesces pixels (e.g., tiles, such as quad tiles) of neighboring primitives into a single group of pixels. The coalescing process is required to make sure that neighboring primitives are received in pixel shader 330 for concurrent shading. In some circumstances it may be necessary to ensure that the z values remain well behaved, since z values are evaluated per sample. Note that the coalescing of multi-samples can be considered to be equivalent to rendering aliased, from a shading perspective, when the pixel is fully covered by the triangles being merged. It is also contemplated that the present invention could be applied to use a pixel shader that accesses the attributes of both triangles, evaluating those attributes at specific subpixel locations so that the pixel shader could take both fragments (both triangles) into account while producing a single output color. Also note that the hardware may render quads even when there are no derivatives being calculated, which is often the dominant mode of operation.

Figure 6:
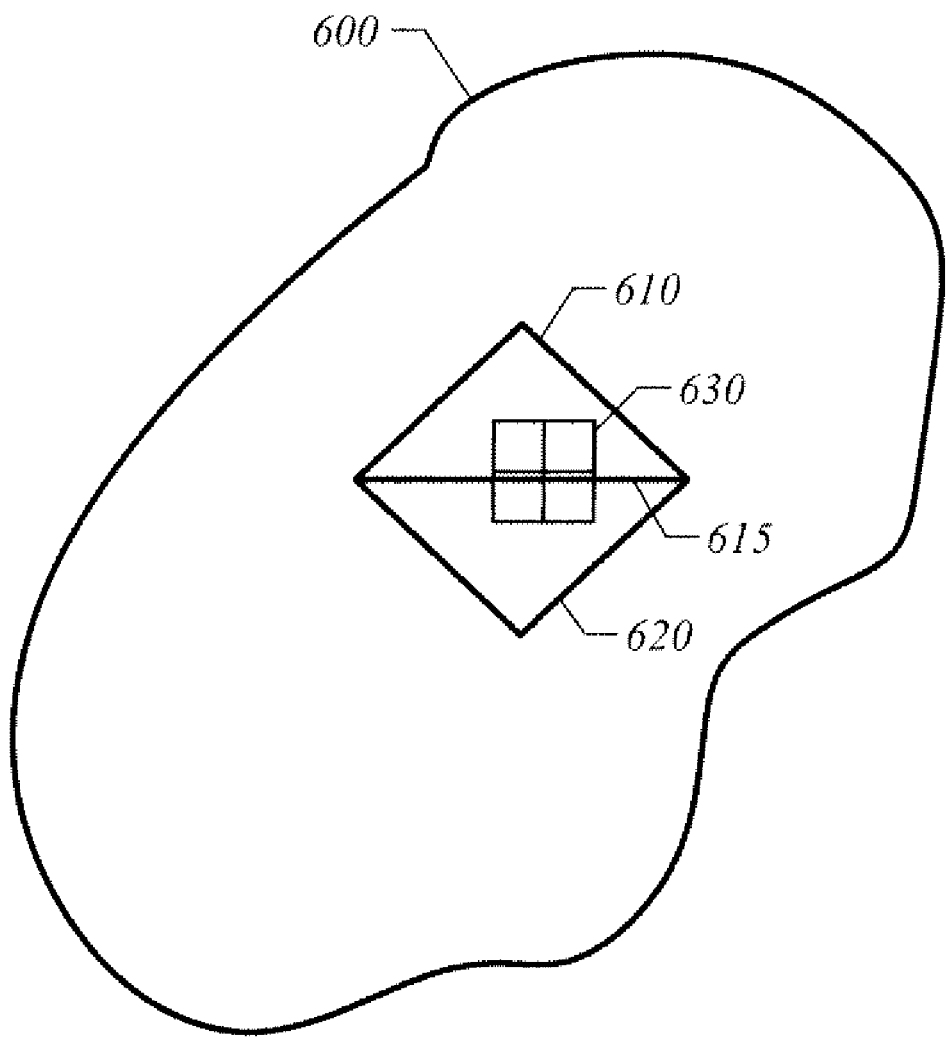
FIG. 6 illustrates the coalescing of pairs of primitives from the same graphical surface for concurrent shading such that derivative footprints straddle a common boundary.

Referring to FIG. 6, adjacent primitives 610 and 620 are coalesced and come from the same graphical surface 600 and share a common boundary 615. A derivative footprint, such as a quad 630, straddles common boundary 615. Consequently, edge pixels in one primitive, such as primitive 620, have a derivative footprint that extends across the boundary 615 into adjacent primitive 610. In one embodiment, both primitives 610 and 620 are concurrently shaded with the pixel data retained for a sufficient length of time such that pixels rendered for one primitive may be used to calculate derivatives for the other primitive and vice-versa. Alternatively, primitives 610 and 620 may be rendered exactly concurrently so the pixel data doesn't have to be retained. As a consequence, the number of pixels that must be rendered solely to generate derivative information is reduced.

One or more rules may be used by pixel processing unit 300 to identify pairs of primitives 610 and 620 having attributes that make it likely that pixels rendered for one primitive, such as primitive 610, may be used to calculate derivative information for adjacent primitive 620. As previously described, the primitives are generally triangles. Primitives 610 and 620 are also preferably atomic primitives that cannot be subdivided, share a common edge, and not overlap. Primitives 610 and 620 share a common edge and do not overlap, which means that that they must face the same direction. As an illustrative example, the graphical surface 600 may be an atomic mesh and primitives 610 and 620 may be mesh primitives or come from a surface tessellated on-chip. Note that pixel processing unit 300 may receive an instruction from software indicating that the surface to be shaded is a mesh primitive or a tessellated surface.

Figure 7:
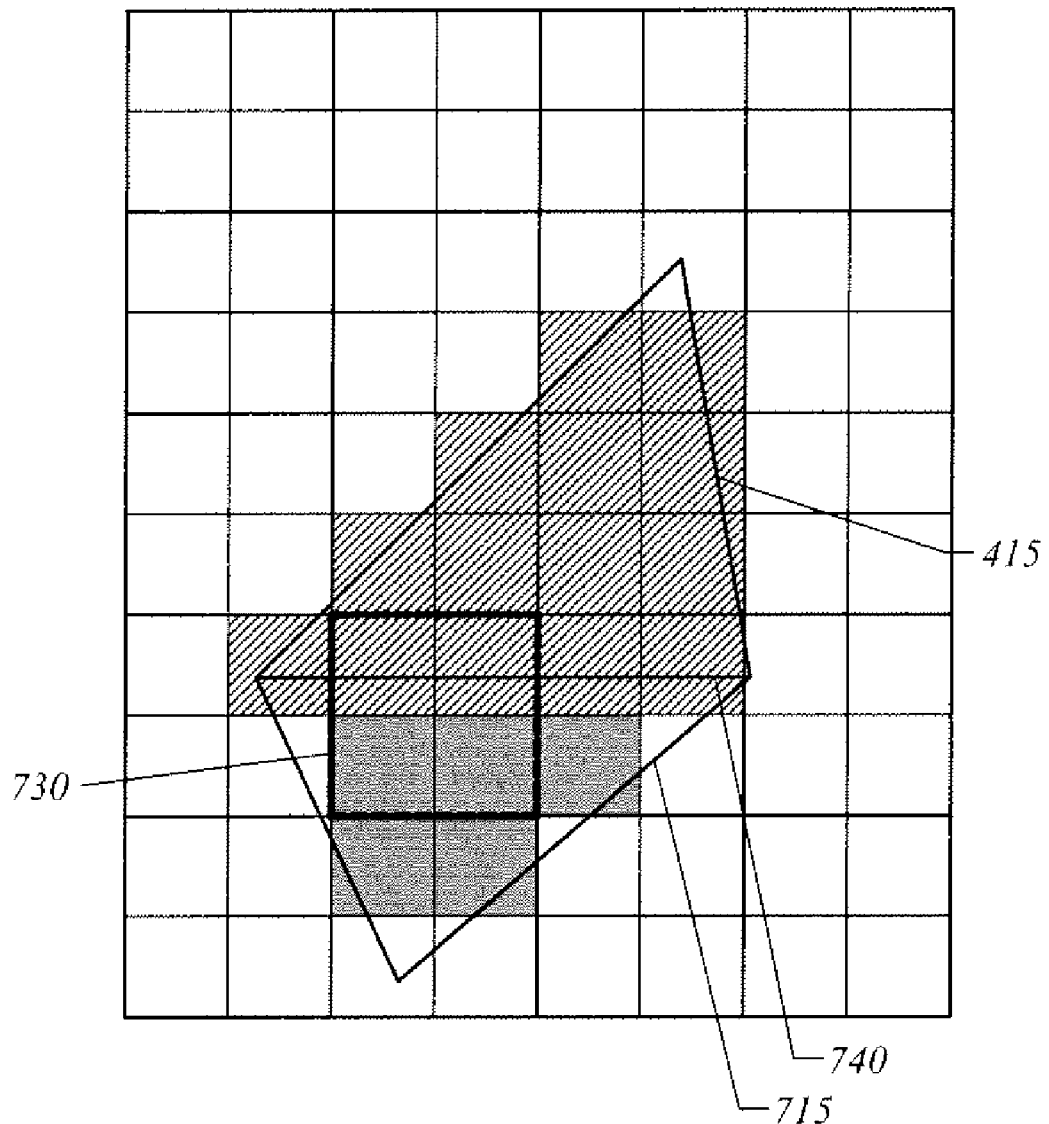
FIG. 7 illustrates a second example of the coalescing of pairs of primitives from a common graphical surface of current shading such that derivative footprints straddle a shared boundary.

FIG. 7 illustrates another example of two primitives 415 and 715 that are identified as belonging to the same graphical surface and which are coalesced for concurrent shading. In this example, the larger graphical surface from which primitives 415 and 715 originate is omitted and the primitives 415 and 715 are illustrated against a screen space. An exemplary quad derivative footprint 730 straddling the common boundary 740 is illustrated. The quad derivative footprint 730 is computed using pixels from the neighboring triangle(s). By comparing FIG. 7 and FIG. 4 it can be understood that the coalescing of pairs of primitives reduces the number of pixels that must be calculated solely for the purpose of generating derivative information.

It will be understood that in one embodiment that pixel processing unit 300 performs both footprint realignment and primitive coalescing of adjacent neighboring primitives to reduce the computational effort to calculate texture derivatives. It will also be understood for the case of small triangles that a derivative footprint may extend over more than two primitives generated from the same surface. For example, three triangles may share a common vertex such that a derivative footprint corresponding to a quad may overlap three triangles. Thus, while a minimum number of triangles required for coalescing is two (i.e., a pair) more generally groups of two or more triangles from the same surface may be coalesced to extend the benefits of concurrently shading neighboring primitives and utilizing pixels rendered for one primitive to generate derivative information for another primitive as described below in more detail. Also, coalescing of multi-samples also improves color compression efficiency.

Referring again to FIG. 3, in one embodiment multi-sampling is supported and pixel shader 330 includes a coalesced group multi-sample module 390. As in the previous example, pairs of non-overlapping primitives (e.g., triangles) having a common boundary (e.g., an edge between two common vertices) are identified by the raster stage as being capable of being coalesced into a coalesced group. That is, adjacent triangles have attributes such that the shading function is continuous with no discontinuities. Exemplary attributes for coalesced groups that can be multi-sampled include shared vertices, no flat shaded attributes, all attributes are interpolated, and that the same shader program be used on all primitives of the coalesced group. Adjacent non-overlapping triangles also face the same direction. This provides several advantages. First, the pixel color needs only be calculated once for each pixel straddling the common boundary, reducing computational effort. Second, there is an improvement in the potential data compression and bandwidth requirements. In particular, the pixel shader 330 needs to run only once to generate a color since it is processed as a coalesced group and then the color is written to a memory 395, such as a frame buffer. In contrast, if coalescing was not performing more shader processing would have to be performed, more memory writes performed, and the effective compression would be reduced, as described below in more detail.

Note that some types of pixel data, such as Z-values, are preferably maintained for each sample location in order to facilitate other pixel processing operations. For example, Z-values at sample locations may be maintained for use by a Z-raster operations module (not shown) to perform a Z-test. As described below in more detail, the pixel shader may also be configured to operate on quad groups of four pixels to evaluate attributes, such as derivatives or other parameters. In this embodiment the pixel shader looks up owners of sampling locations and evaluates its attributes.

Figure 8:
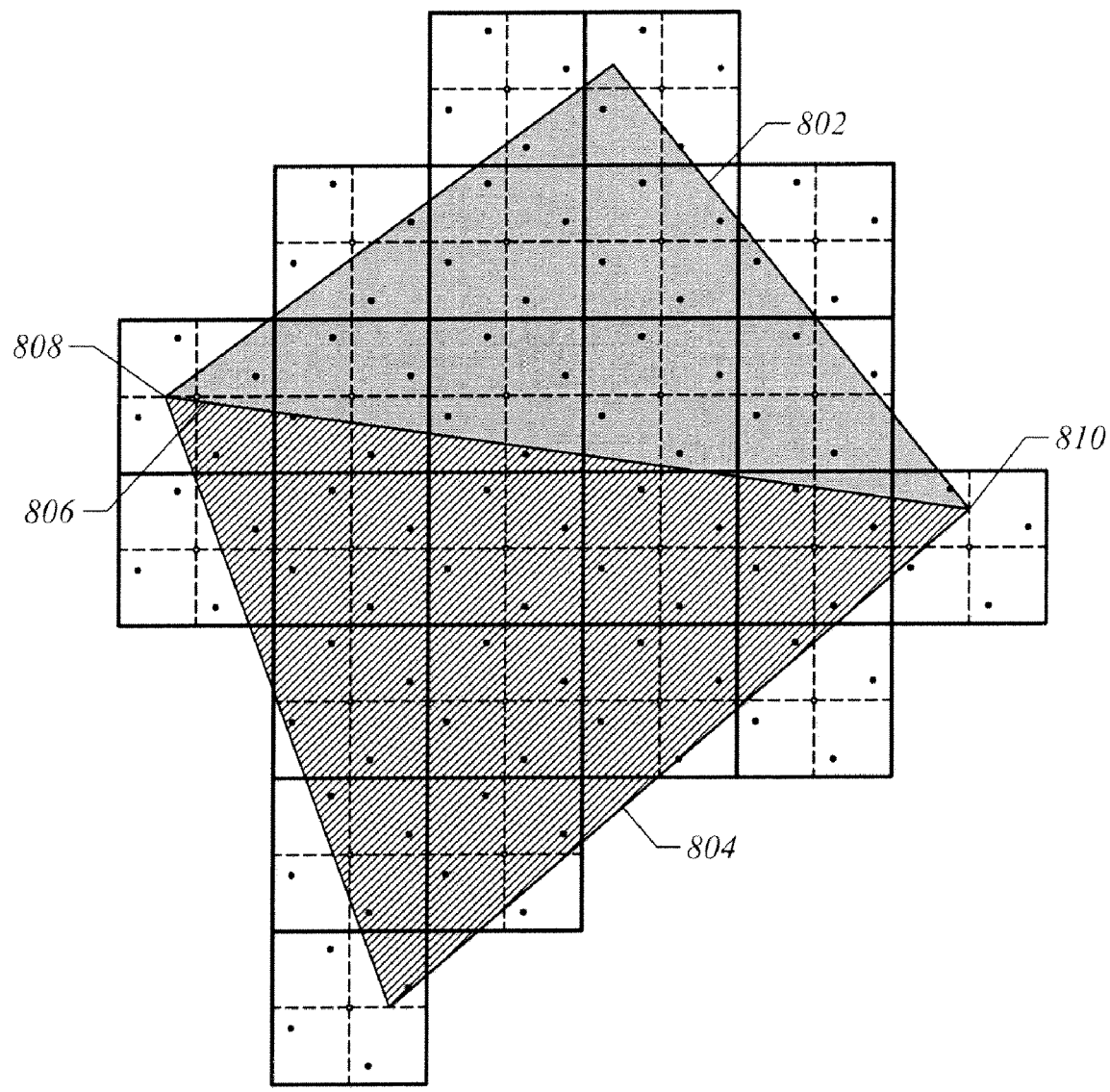
FIG. 8 illustrates an example of coalescing of pairs of primitives for multi-sampling in accordance with one embodiment of the present invention.

FIG. 8 illustrates some of the benefits of multi-sample pixel coalescing. The bold grid lines define pixel-squares having 4 sub-blocks. Sample locations in each individual pixel are illustrated by four solid dots arranged in a rotated grip pattern. The pixel center is illustrated by an open dot. A first primitive 802 and second primitive 804 are illustrated as having a common boundary (i.e., a common edge) 806 between common vertices 808 and 810.

Figure 9:
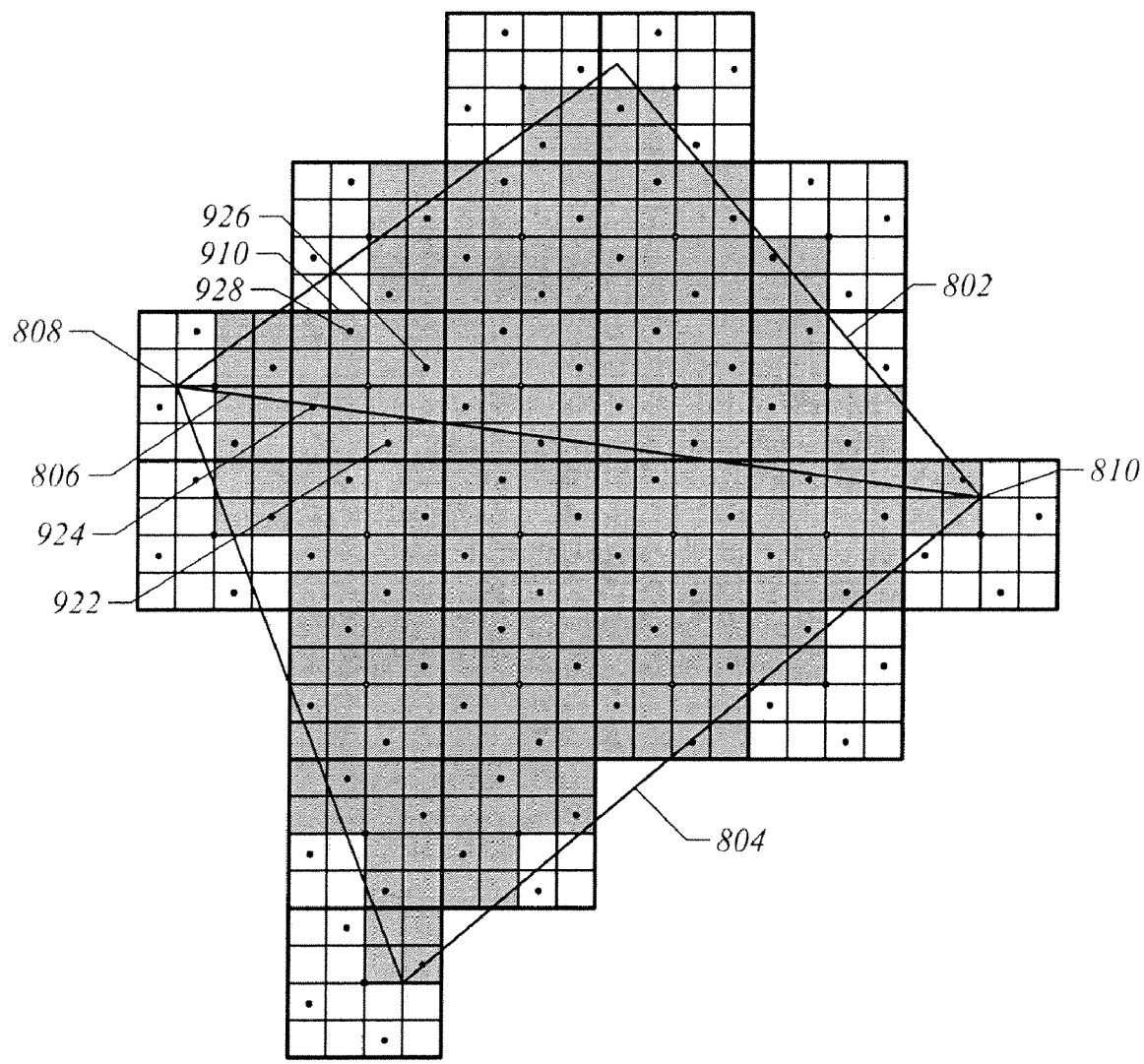
FIG. 9 illustrates sample locations within a single pixel straddling the two primitives of FIG. 8 in accordance with one embodiment of the present invention.

Referring to FIG. 9, a benefit of multi-sample pixel coalescing is that for a coalesced group of primitives 802 and 804 the multi-sample calculations for a pixel 910 can be performed concurrently to generate one color. For example, pixel 910 straddles common edge 806 in that it has at least one sample location covered by primitive 802 and at least one sample location covered by primitive 804. For example, sample location 922 is covered by primitive 804. Sample locations 926 and 928 are covered by primitive 802. Sample location 924 is illustrated as being disposed along common edge 806. By coalescing primitives 802 and 804 into a group, the color at each sample location can be determined once and a single color generated for pixel 910 which is then written to memory. For example, an index such as a bit code, can be used to identify which primitive covers a particular sample point in pixel 910. For the case of a four-sample multi-grid pattern a two bit code is sufficient to identify which primitive covers (e.g., "owns") a particular sample location (e.g., 00 for no coverage, 01 for one of the primitives, 10 for another primitive, 11 for the case of a third primitive). A default rule is preferably provided for deciding ownership when the common edge 806 intersects a sample location (such as for the case of sample location 924). The pixel shader 330 then uses the coverage information of the index to determine a color for the entire pixel 910. Since a single color for the entire pixel may be written to memory, this results in a compression in memory storage and bandwidth requirements compared to the case of storing colors for each individual sample location as is normally the case with partially covered pixels.

Figure 10:
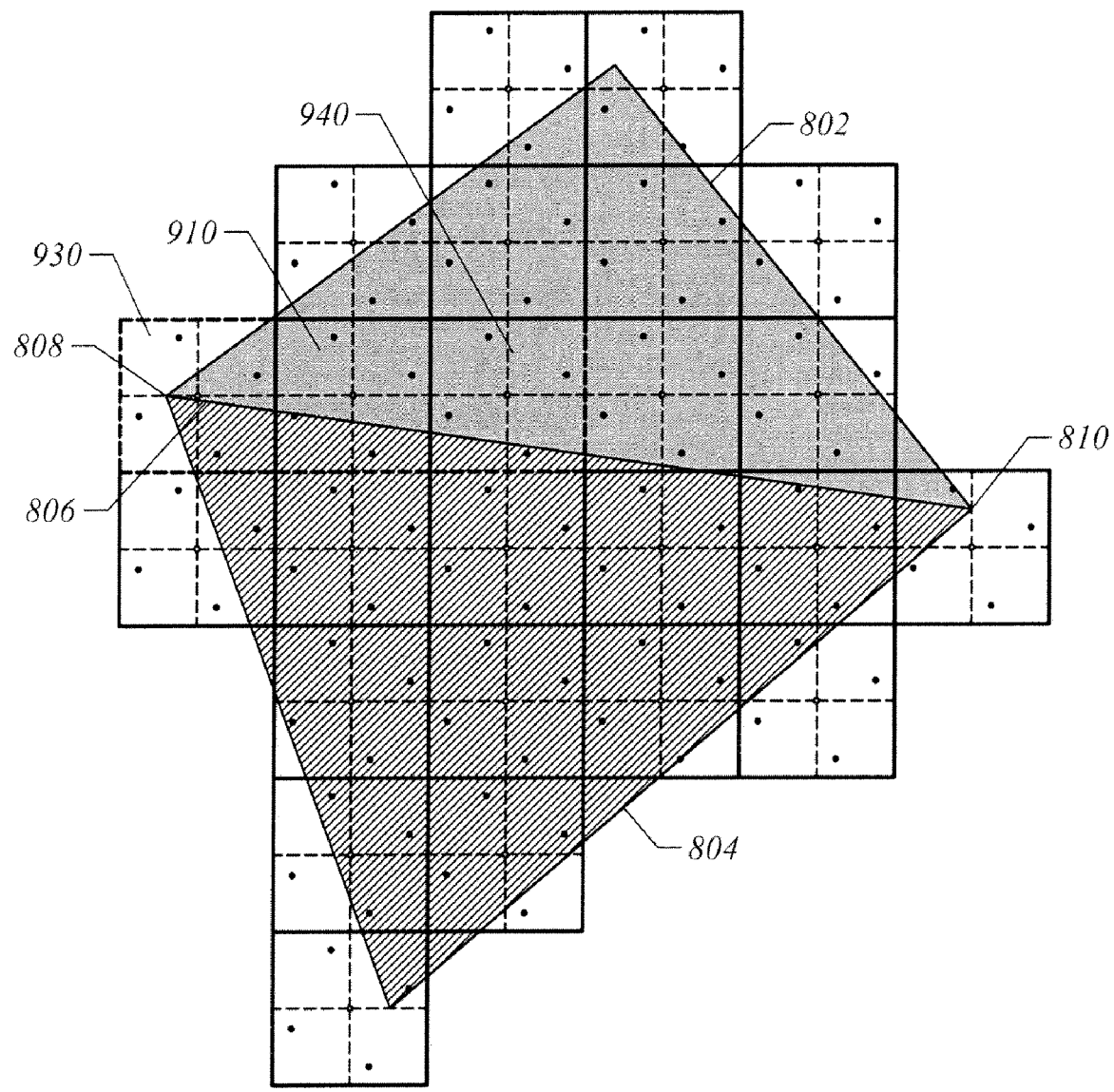
FIG. 10 illustrates how coalescing reduces shader computations in the example of FIG. 8 in accordance with one embodiment of the present invention in accordance with one embodiment of the present invention.

Referring to FIG. 10, in the illustrated example there are three pixels 910, 930, and 940 which are partially covered and which have at least one sample location covered by primitive 802 and at least one sample location covered by primitive 804. For the purposes of illustration, a dashed line is illustrated around primitives 910, 930, and 940. If each primitive 802 and 804 were separately shaded then multi-sampling calculations would have to be performed twice for primitives 910, 930, and 940, once when primitive 802 was shaded and then a second time when primitive 804 was shaded. Thus, in this example by forming a coalesced group in which pixels 910, 930, and 940 are shaded once, the work of shading three pixels is eliminated. Additionally, as previously described the amount of data that must be stored for pixels 910, 930, and 940 is reduced because for a coalesced group a single color may be stored for the entire pixel.

Figure 11:
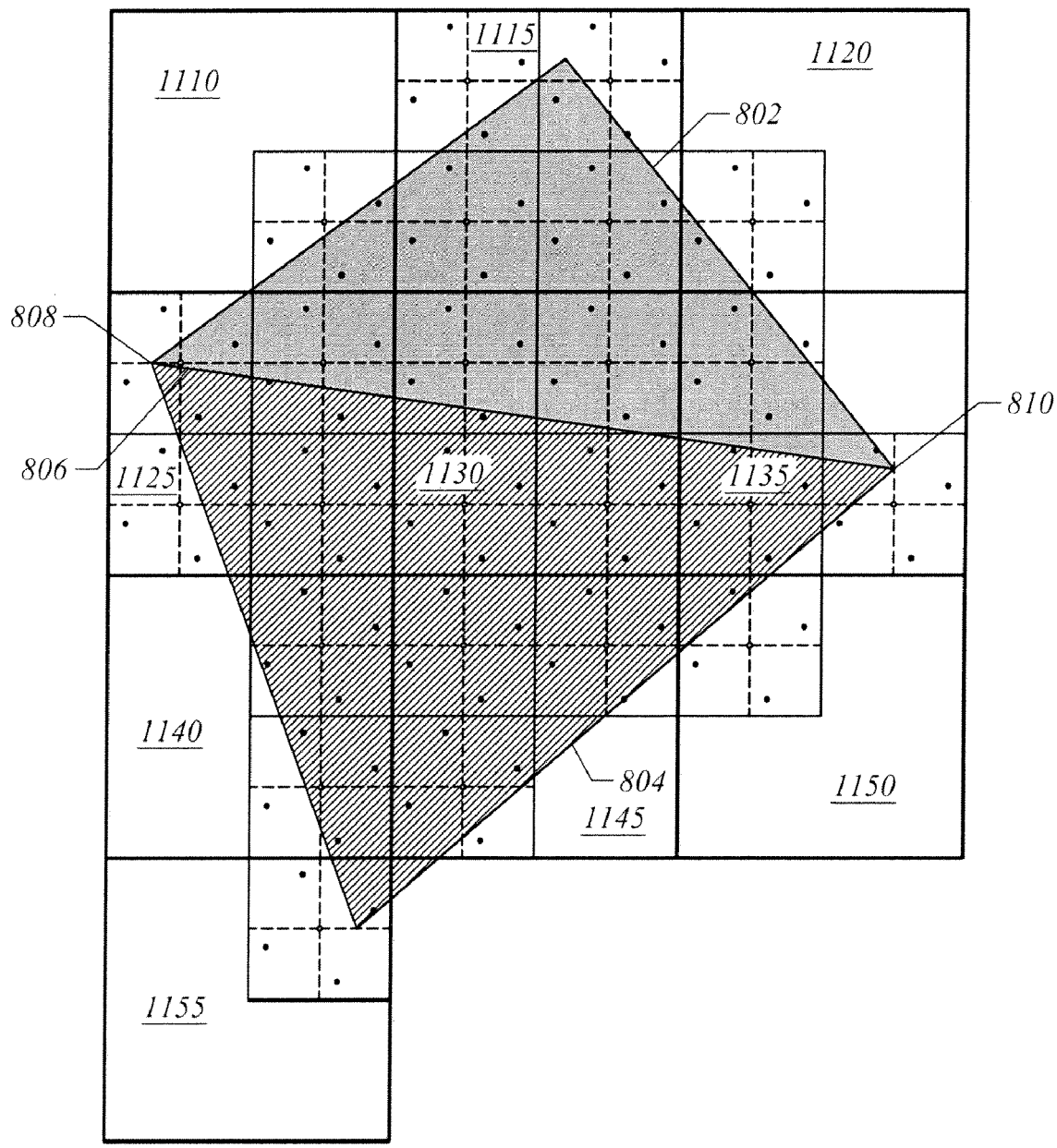
FIG. 11 illustrates an embodiment in which coalescing improves multi-sampling and texture coordinate derivative evaluation.

In one embodiment, coalescing of primitives is performed to improve the efficiency of both multi-sampling and derivative calculations. For derivative calculations the pixel shader 330 operates on quad groups of four pixels. Thus for an attribute evaluation (e.g., a derivative texture lookup or a parameter) the pixel shader 330 looks up the owner of a sample location and evaluates its attribute. Referring to FIG. 11, a coalesced group of primitives 802 and 804 is illustrated with additional quad groups of four pixels 1110, 1115, 1120, 1125, 1130, 1135, 1140, 1145, 1150, and 1155 illustrated in bold lines. If the primitives were not coalesced, quad groups 1125, 1130, and 1135 would have to be calculated separately for each primitive in order to calculate derivatives for each primitive along edge 806. As a result, coalescing primitives 802 and 804 reduces the number of pixels that must be calculated solely for the purposes of derivative calculations. Additionally, coalescing primitives 802 and 804 improves multi-sampling, as previously described.

It will be understood that while the pixel shader has been described as generating a color, the present invention may be applied to shaders that generate many output values. For example, the DX10 API currently permits a single pixel to hold as many as 32 values on output.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics processing apparatus, comprising:
a raster stage configured to identify neighboring primitives for concurrent multi-sample processing as coalesced groups each coalesced group comprising adjacent non-overlapping triangles generated from a common surface; and
a pixel shader configured to concurrently shade individual coalesced groups with the shading including texture operations to determine the color of pixels within coalesced groups;
wherein said pixel shader is configured to evaluate pixel attributes at each multi-sample sample location within a coalesced group to concurrently perform multi-sampling of sample locations within the coalesced group for pixels straddling a common edge between neighboring primitives of said coalesced group and generate a single color while retaining z-data for a plurality of multi-sample locations for each pixel straddling a common edge between neighboring primitives of said coalesced group to perform z-testing.

2. The graphics processing apparatus of claim 1, wherein said pixel shader generates texture coordinate derivative information for primitives within a coalesced group, said pixel shader utilizing quad groups of four pixels for texture coordinate derivative calculations with at least one pixel rendered for a first primitive on one side of a common edge for use in a group footprint to calculate texture coordinate derivative information for at least one pixel of a second primitive on the other side of said common edge.

3. The graphics processing apparatus of claim 1, wherein a raster stage generates an index identifying which primitive covers each sample location for pixels straddling a common edge.

4. The graphics processing apparatus of claim 1, wherein an index comprises a bit code.

5. The graphics processing apparatus of claim 4, wherein a pixel shader performs a lookup operation to identify a primitive owning a sample location and then evaluates an attribute based on the associated attribute of the primitive.

6. The graphics processing apparatus of claim 1, wherein said pixel shader utilizes a group footprint within each said coalesced group to calculate derivative information for at least one edge pixel of a primitive in said coalesced group.

7. The graphics processing apparatus of claim 1, wherein said raster stage further comprises:
a raster support module to identify adjacent triangles generated from the same graphical surface; and
a multi-triangle coalesce module to coalesce pixels rasterized for adjacent primitives.

* * * * *